United States Patent
Aoyama et al.

[15] 3,651,737
[45] Mar. 28, 1972

[54] GEAR CUTTING APPARATUS

[72] Inventors: Shoichi Aoyama; Shigeichi Nomoto, both of Tokyo, Japan

[73] Assignee: Oval Kiki Kogyo Kabushiki Kaisha, Tokyo, Japan

[22] Filed: Sept. 30, 1969

[21] Appl. No.: 862,191

[52] U.S. Cl. ............................................. 90/8, 90/9, 90/10
[51] Int. Cl. ............................................................ B23f 9/08
[58] Field of Search ............................................ 90/9, 10, 2, 8

[56] References Cited

UNITED STATES PATENTS 2,856,823   10/1958   Knuttel .................................... 90/2

FOREIGN PATENTS OR APPLICATIONS 684,838   12/1939   Germany .................................... 90/9

Primary Examiner—Gil Weidenfeld
Attorney—Michael S. Striker

[57] ABSTRACT

A gear cutting apparatus, especially for cutting gears on a gear blank of elliptical cross section, wherein a rotatable cutting tool reciprocable in a direction normal to its axis of rotation cuts helical teeth in the gear blank which is mounted for rotation about an axis parallel to the direction of reciprocation of the cutting tool.

7 Claims, 4 Drawing Figures

GEAR CUTTING APPARATUS

This invention relates to a gear cutting apparatus.

An object of the present invention is to provide a gear cutting apparatus adapted for the formation of helical teeth on any gear blanks having non-circular as well as circular cross sections.

In general, when cutting helical gears on generally cylindrical gear blanks having non-circular cross sections, by means of a vertically reciprocated revolving cutting tool, the gear blank must be intermittently turned about its axis as the cutting operation proceeds. Hence, the rotary base carrying the gear blank must be shifted in a regulated manner both lengthwise and crosswise of the stationary base block for bringing the gear blank in position for the gear cutting operation. Moreover, the rotary base must be rotated through a certain predetermined angle relative to the cutting tool each time the latter has been shifted to the upper or lower extremity of the vertical cutting stroke. In order to fulfil these various requirements, the conventional gear cutting apparatus is generally very difficult to use and highly complicated in its design.

It is therefore another object of the present invention to obviate these drawbacks and to provide a gear cutting apparatus of the type in which the cutting tool in the form of a rack or a hob is reciprocated vertically against a work held on a rotary base which is turned through a certain angle each time the vertical cutting stroke of the cutting tool has come to an end. According to the present invention, rotation of the rotary base carrying the gear blank may be obtained by the rotation of a worm wheel mounted on the same shaft as said rotary base and being similarly contoured as the cross section of the blank, while a worm meshing with said worm wheel is driven from an intermittently operated electric motor serving as the drive source. A master cam mounted on the same shaft as said worm wheel and being similarly contoured with the latter is provided and the blank may be also fed both lengthwise and crosswise by the intermediary of a second intermittently operated electric motor and differential gears, thereby enabling the continuous and fully automatic gear cutting operation.

When cutting a work having a non-circular cross section, there is induced a considerable increase in the cutting load applied to the work from the cutting tool, as the cutting operation proceeds from the peripheral part of the work with a lesser radius of curvature to that with a larger radius of curvature, thereby adversely affecting the finishing machining operation.

A further object of the present invention is to obviate such a drawback and to provide a gear cutting apparatus in which the torque developed by an intermittently operated electric motor is transformed, as for instance by means of a gear having partly removed or interrupted teeth, into a desired amount of the intermittent rotation of the master worm, thereby turning the blank through an angle corresponding to the rotation of the master worm; the inaccurate intermeshing between the cutting tool and the gear blank thus brought about being compensated by the displacement of the work carrying slidable worktable in the reverse direction to the cutting direction of the work and by the distance corresponding to the rotation of the master worm wheel meshing with said master worm; and the displacement of the abutting point of the work with the cutting tool brought about by the repetition of the above-mentioned procedure being compensated by the shifting of the work carrying slidable worktable in the opposite direction to the cutting direction of the work in an amount equal to the whole number multiple of the pitch of the threads on the cutting tool; said shifting of the worktable being induced by means of a second intermittently operated electric motor by the intermediary of change gears and differential gears and irrespective of the rotation of the said worm, thus enabling the cutting operation to be enacted in the vicinity of the center of the cutting tool and the large-size gears to be machined automatically.

A still further object of the present invention is to provide a gear cutting apparatus comprising a first worktable slidably mounted lengthwise and adapted for setting the work in the cutting position with relation to the dimension of the work to be machined; a second worktable slidably 30 mounted crosswise on said first worktable and adapted for bringing the work into engagement with the teeth on the cutting tool; a third worktable slidably mounted lengthwise on the said second worktable by the intermediary of a worm, a master worm wheel meshing therewith and a master cam, mounted thereto and cooperating for turning the work about the axis; and a vertically reciprocated revolving cutting tool adapted for cutting the work carried on the said third worktable.

Figure 1:
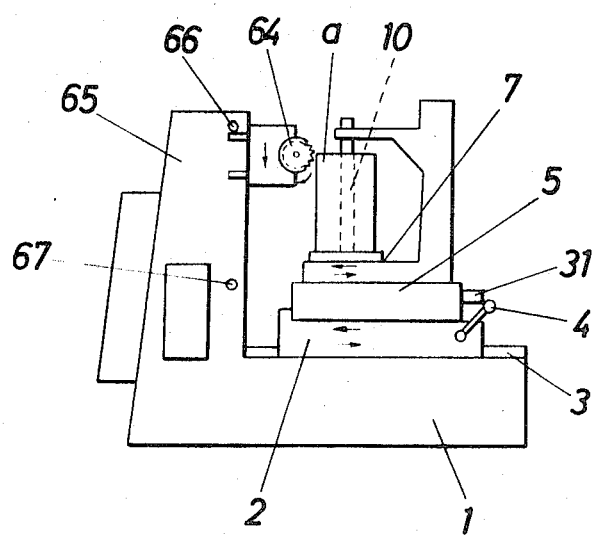
FIG. 1 is an overall schematic side elevational view showing an embodiment of the gear cutting apparatus according to the present invention.
Figure 3:
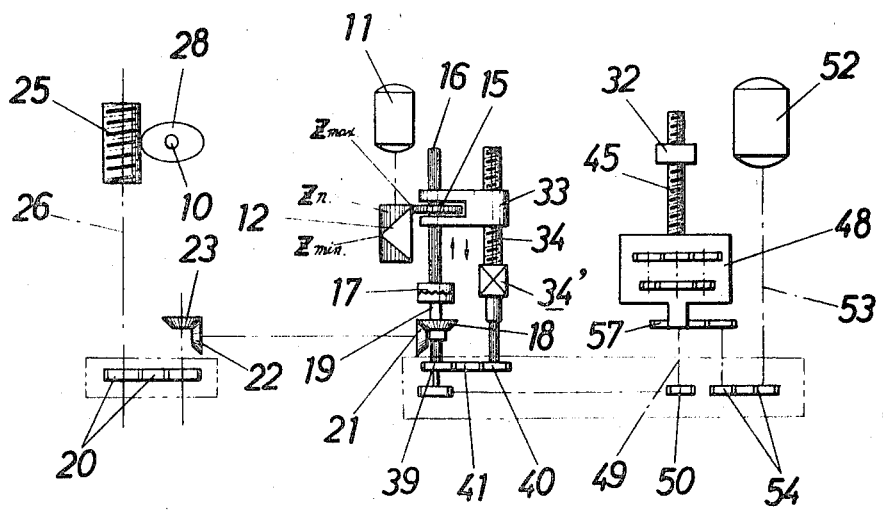
FIG. 3 is an explanatory view showing the manner of the operation of the present apparatus.

Referring to the drawing, numeral 1 denotes a bed or base block, and numeral 2 denotes a first worktable lengthwise slidable along a pair of guide rails 3 on the base block 1. A second worktable 5 received in a recess 6 on the worktable 2 is slidable crosswise of the base block 1. A third worktable 7 is slidably mounted lengthwise in a recess 8 on the worktable 5. Said slidable table 7 mounts a rotary base 9 for supporting a gear blank $a$ and a shaft 10 for carrying the gear blank $a$. An electric motor 11, such as torque actuator, is mounted laterally to said table 5 and adapted to turn for a predetermined number of revolutions when actuated. A gear 12 formed with interrupted axially extending gear teeth in connection with said electric motor 11 through a gear train 13 and an electromagnetically operated clutch 14. Said gear 12 is formed with partly stripped or interrupted axially extending teeth 12' so that the number of teeth on the gear varies from a maximum to a minimum and again to the maximum when viewed from one end to the other of the gear 12. Axially successive peripheral parts of the gear 12 will thus have a maximum and a minimum number of teeth which are denoted as Zmax and Zmin, respectively.

It will be readily understood that the continuous or intermittent rotation of the motor 11 may be transmitted to the gear 12 coupled to the motor shaft and thence to the gear 15, the latter being thus caused to travel, when reciprocated in axial direction of the gear 12, in meshing with the toothed part Zmax, then with the toothed part Zmin and then the toothed part Zmax at the opposite end of the gear 12. Supposing that the number of teeth on the gear 12 is equal to $Zn$ and the number of teeth on the gear 15 is equal to $Z'$, and that the gear 15 meshing with the gear 12 is displaced lengthwise at the same time that it is rotated then the gear 15 will be rotated at variable speeds expressed by the formula $$\frac{Z\max}{Z'} \rightarrow \frac{Z\min}{Z'} \rightarrow \frac{Z\max}{Z'}$$

When the gear 12 rotates continuously, the gear 15 meshing therewith rotates continuously at the aforesaid variable speeds; when the screw 12 rotates intermittently for a certain given number of revolutions, the gear 15 rotates intermittently.

Numeral 16 denotes a spline shaft fixed to said gear 15, numeral 17 denotes an electromagnetically operated clutch which connects said spline shaft 16 with a hollow shaft 19 which mounts in turn a bevel gear 18. Numeral 20 denotes a profile changing gear train to which the rotation of the bevel gear 18 is transmitted through a second bevel gear 21 meshing with said bevel gear 18, and the intermeshing gears 22, 23. Said gear train 20 is adjustably or exchangeably housed in a gear box 24 which is laterally mounted to said second worktable 5. Numeral 25 denotes a worm secured to the output shaft 26 of said gear train 20 and numeral 27 denotes a removably mounted worm wheel meshing with said master worm 25 and having a non-circular or circular configuration. Numeral 28 denotes a removably mounted cam having the same shape as said worm wheel 27, and mounted coaxially with the latter on a common mounting shaft connected to the shaft 10 on the work table 7 adapted for carrying the work $a$. Said master worm wheel 27 is formed with helical teeth for meshing with the master worm 25 and both the worm wheel 27 and the cam 28 have the general shape corresponding with that of the workpiece $a$ and mounted in position for the gear cutting operation by changing one of the profile exchanging gear train 20. Numeral 29 denotes a slidable bar or follower permanently abutting against the periphery of the master cam 28. There is provided a hydraulically operated copying or profiling unit comprising a hydraulic cylinder 31 mounted on the second work table 5 and a piston rod 32 associated therewith. Said copying or profiling unit is so operated that the displacement of the slidable bar 29 is transmitted to the hydraulic cylinder 31 and the piston rod associated therewith acts in turn for urging the third slidable worktable 7 lengthwise and for an amount corresponding to the displacement of the bar 29.

Numeral 33 designates a forked member which is associated with said gear 15 for moving the latter lengthwise on the spline shaft 16. Numeral 34 designates a screw threadedly connected to said forked member 33. Said screw 34 being rigidly coupled to a hollow shaft 35 which in turn is arranged in side-by-side relation with the shaft 19. Numerals 36 and 37 denote spline shafts respectively associated with said hollow shafts 19 and 35 and fixed to the gears 39 and 40 housed in a gearbox 38 mounted laterally on the slidable table 2. Said gears 39 and 40 are operatively associated with each other by one or more intermediate gears, only one of which is shown at 41 in the drawing. Numeral 42 denotes a rod rigidly connected to the extremity of the forked member 33 and adapted for actuating a pair of switch means 43, 44 for actuating the gear train 34' in either directions, as will be explained more in detail hereinafter.

A screw 45 passed through a guide aperture 46 on the worktable 2 engages in a female threaded stopper member 47 which in turn is secured laterally to said second slidable table 5. Numeral 48 denotes a differential gear train interposed between said screw 45 and a transmission shaft 49, and numeral 50 denotes a gear fast on the extreme end of the transmission shaft 49 and operatively associated with the gear 39 by the intermediary of a gear 51. Numeral 52 designates an electric motor similar to 11 and which is set into actuation for a predetermined number of rotations when actuated. The shaft 53 of the motor 52 bridges the recess 6 on the worktable 2 and is associated with a return gear train 54 housed in a second gearbox 38. The output shaft 55 of the gear train 54 carries fixed thereto the gear 56 which meshes with the gear 57 on the transmission shaft 49. When the second worktable 5 is moved crosswise and an actuator 59, fixed to the first worktable 2, depresses the switch means of the microswitch 58 on the second worktable 5, the circuit of the motor 52 is closed. Numeral 60 denotes a shaft of a handle 4 attached to the first worktable 2 and manual rotation of the handle 4 is transformed into a lengthwise movement of the first worktable 2 through the intermediary of a gear train 61, a screw shaft 62 arranged in parallel with the direction of displacement of the first worktable 2 and an internally threaded sleeve 63 meshing with the screw shaft 62 and secured to the front of the first worktable 2.

Numeral 64 denotes a vertically reciprocable rotary cutting tool mounted on the upright tool post 65 integral with the base block 1 and numerals 66, 67 denote a pair of switch means adapted for closing the circuit of the motor 11 when actuated by the cutting tool 64 at the ends of the cutting stroke of the latter.

The operation of the apparatus described in the foregoing will be explained in detail by referring to the accompanying drawing in which a generally cylindrical blank having an elliptical cross section is to be provided with helical teeth around its periphery.

Figure 2:
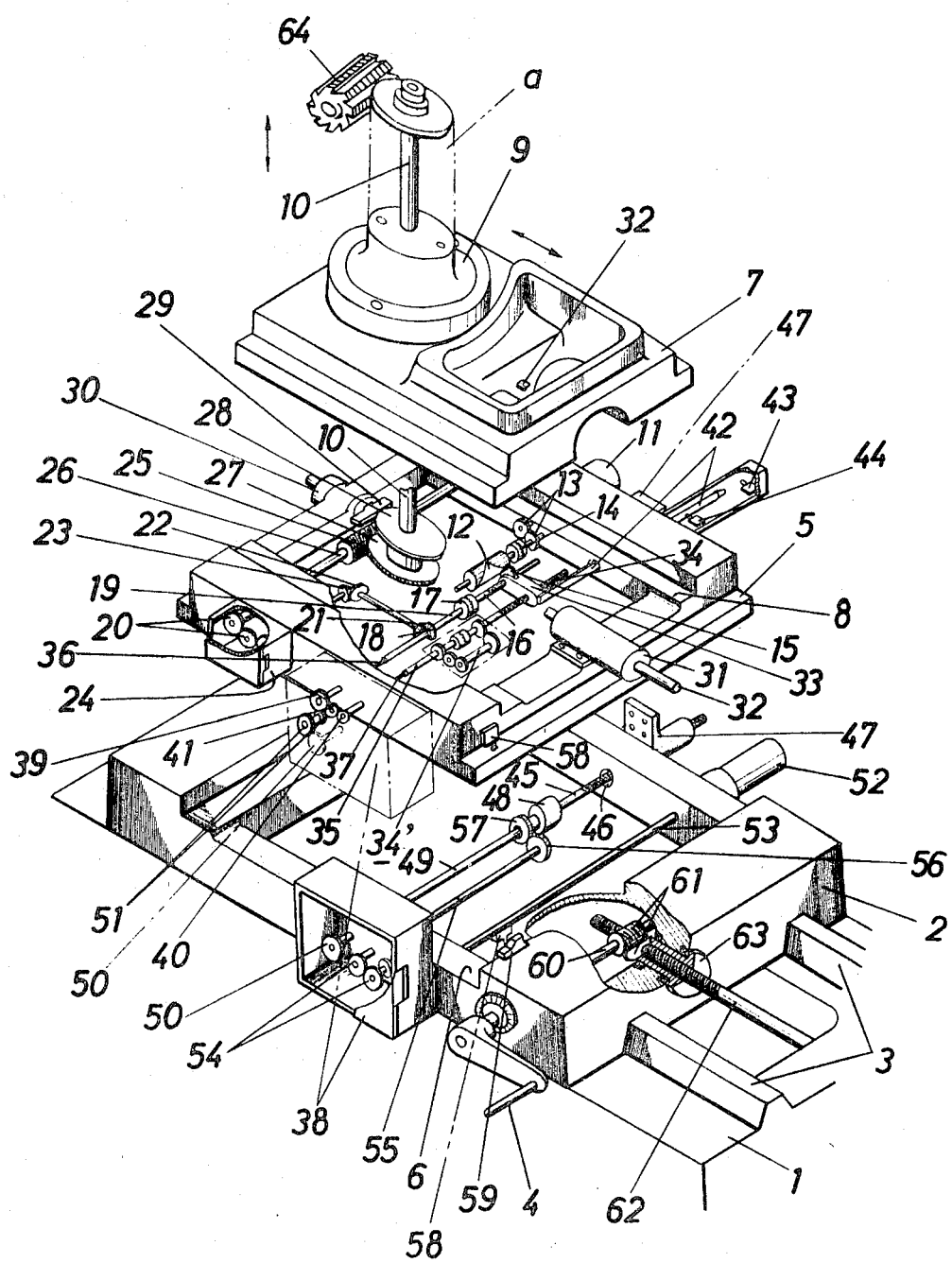
FIG. 2 is an exploded perspective view thereof.
Figure 4:
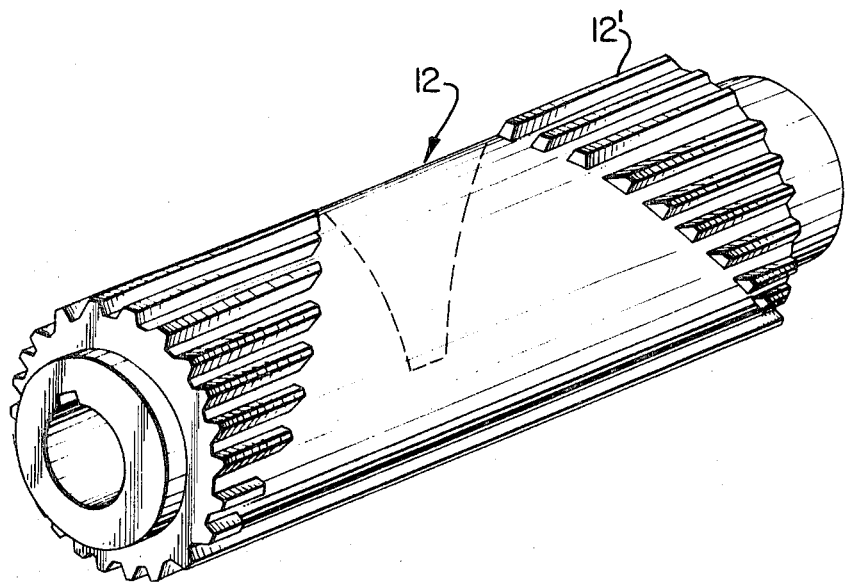
FIG. 4 is a perspective view of the gear with partly removed teeth, drawn to an enlarged scale.

The work or blank $a$ is fixedly supported on the shaft 10 and the worktable 2 set to the correct working position by manipulating the handle 4. FIG. 2 shows the preferred position assumed by the worktable 2 for initiating the gear cutting operation. The rotary tool 64 is then rotated about its axis by a device not shown in the drawing and the peripheral part of the blank $a$ corresponding to the major axis of the ellipse is abutted against the rotating tool 64. When the cutting tool descends cutting the blank $a$ is cut from top toward bottom and the tool 64, the tool comes into contact with the lower switch means 67 provided on the upright tool post 65 integral with the bed 1. The motor 11 is thereby set into operation and turned a predetermined number of revolutions, thereby the gear 12 is turned through 360° by the intermediary of the gear train 13 and the clutch 14.

The gear 15 meshing with the gear 12 rotates simultaneously therewith and the torque is transmitted through the electromagnetic clutch 17, bevel gears 18, 21, 22 and 23, profile changing gear train 20, worm 25, and the worm wheel 27, which is thereby turned about its axis through a predetermined angle.

When the master worm wheel 27 during its rotation along its peripheral portion having the lesser radius of curvature with the worm 25, the axis of the worm wheel 27 is displaced relative to the axis of the worm 25. The displacement of the worm wheel 27 and of the oval cam 28 mounted coaxially therewith is followed by the slidable bar or follower 29 and the sliding motion of the latter is transmitted to the pilot hydraulic unit 30. The pressurizing cylinder 31 of the hydraulic unit 30 is thereby set into operation and the piston rod 32 cooperating therewith causes the worktable 7 and the blank $a$ to be displaced for adjusting the position of the latter to the optimum working position relative to the cutting tool 64. The thus resulted displacement of the worktable 7 causes the blank carrying shaft 10 to move towards the tool arbor and simultaneously the master worm wheel 27 is held meshing engagement with the worm 25.

The rotation of the spline shaft 16 of the gear 15 is transmitted to the hollow shaft 19, spline shaft 36, gear 39, intermediate gear 41, gear 40, spline shaft 37 and gear train 34' and thence to the screw 34, the forked member 33 threadedly attached to the screw 34 being thereby caused to move for a certain distance corresponding to the rotation of the spline shaft 16, and the gear 15 threaded to the latter being caused to move therewith in axial direction for a certain distance.

On the other hand, the rotation of the gear 15 is transmitted through gears 39 and 51 to the gear 50 and rotation of the shaft 49 of the latter causes in turn the rotation of the differential gear train at 48 and the screw 45. The stopper member 47 threaded to the screw 50 is set into motion and the second worktable 5 secured to the stopper member 47 is caused to move crosswise through the necessary distance for setting the blank into the correct working position relative to the revolving cutting tool 64. When the gear blank $a$ has been turned with the shaft 10 through the desired amount, with the gear blank $a$ engaging the teeth on the revolving cutting tool, the cutting operation is again initiated, this time from the lower towards the upper end of the gear blank $a$, the cutting tool being actuated in a known manner for rotating and being elevated in its position. At the end of the upward stroke of the revolving tool 64, it touches the upper switch means 66 on the vertical tool post 65 annexed to the bed 1, so as to close the circuit comprising the motor 11 in the aforementioned way, thereby the latter being set into rotation for a predetermined number of revolutions, and the gear 12 mounted on the shaft of the motor 11 being turned therewith by one full revolution. The gear 15 meshing with the gear 12 rotates with the latter but in an intermittent manner, that is, the gear 15 is turned only when it meshes with the teeth of the gear 12. The interrupted rotation of the gear 15 is now transmitted to the worm 25, screws 34 and 45, thereby causing the gear blank to rotate through a predetermined angle and the worktables 5 and 7 to slide crosswise and lengthwise of the base 1, respectively, as described in the foregoing, for adjusting the gear blank $a$ at all times to the correct working position relative to the revolving tool 64.

Whenever the revolving cutting tool 64 is reversed on its vertical stroke for the gear cutting operation, the work $a$ is turned on the shaft 10 by degrees and at the same time it is adjusted to the optimum operating position relative to the cutting tool 64.

As the cutting operation proceeds in this way, there is a tendency for the work $a$ to be displaced in one direction along the toothed face of the cutting tool. When the work $a$ is shifted by a certain predetermined distance, the stationary cam 59 on the worktable 2 touches the microswitch 58 on the sliding worktable 5 so that the second electric motor 52 is set into rotation for a certain predetermined number of revolutions and the thus induced rotation of the motor 52 is transmitted to the shaft 55, through a second gear train 54, for setting the gear 56 on the shaft 55 into rotation. The rotation of gear 56 is now transmitted to the mating gear 57 and the differential gear train at 48 associated therewith is turned axially in the reverse direction to that referred to in the foregoing. In this way, the second worktable 5 secured to the stopper means is actuated in the reverse direction to that above described and now returned to its starting operative position.

It will be appreciated from the foregoing description that the cutting face of the work $a$ may be brought to its initial working position relative to the cutting tool 64 by the intermittent rotation of the motor 52 and the work of the desired dimensions may be machined with the same cutting tool. When the periphery of the work $a$ corresponding to the minor axis of the ellipse meshes with the tool 64, the gear 15 is meshing with the toothed part Zmin of the gear 12 corresponding to the minimum number of the teeth on the gear 12. When the gear cutting is proceeded still further and the tool 64 meshes with the peripheral part of the work $a$ corresponding to the major axis of the ellipse, the gear 15 is brought into meshing with the toothed part Zmax of the gear 12 corresponding to the maximum number of the teeth on the gear 12.

When the gear teeth are formed on the lastly mentioned peripheral part of the work $a$, the second switch means 44 is now actuated by the forked member 33 associated with the gear 15, and the operation of the gear train 34 is reversed to that described in the foregoing.

The gear 15 is actuated thereby to move in the opposite sense and brought into meshing with the toothed part Zmax of the gear 12, then with the part Zmin and again with the toothed part Zmax of the gear 12 said toothed parts of the gear 12 correspond respectively with the peripheral parts of the work $a$ with the major axis and the minor axis of the ellipse and the major axis of the ellipse corresponding to the initial operative position of the work $a$.

While the foregoing description has been limited to the gear cutting operation of a generally cylindrical work with an elliptical cross section, it is to be noted that the present apparatus may also be employed for the gear cutting operation of the work having circular as well as other non-circular cross sections.

As will be realized from the foregoing, the torque of the motor 11 is converted into the design value of the angular motion of the worm and the worm wheel associated therewith, by the intermediary of the gear formed with partly stripped or interrupted teeth and the gear trains, thereby turning the work through a predetermined angle. The present invention enables, in addition, the same torque of the motor 11 to be transmitted to the second worktable 5 by the intermediary of the gear trains and the differential gear train, thereby the worktable 5 being actuated crosswise of the base block 1 for bringing the work in position for the subsequent continuous cutting operation. Moreover, when the worktable 5 has been displaced by a certain predetermined distance, the second electric motor 52 is set into actuation for returning the said worktable 5 to the initial operating position by the intermediary of the gear train and the differential gear train.

In this way, as the revolving cutting tool reciprocates vertically, the work may be brought at all times in position for the cutting operation, and the helical teeth may be generated on the generally cylindrical work having noncircular, such as elliptical cross section, or circular cross section in an automatic and highly efficient way. Furthermore, the work having any desired dimension may be machined by exchanging the master worm wheel or master cam or one or more of the profile exchange gears.

We claim:

1. In a gear cutting apparatus, especially for cutting gears on a gear blank of elliptical cross section, a combination comprising tool support means; a rotatable cutting tool mounted on said tool support means, said means supporting said cutting tool for rotation about a first axis and for reciprocation between two end positions in a direction normal to said first axis; means for supporting said gear blank for rotation about a second axis parallel to the direction of reciprocation of said cutting tool; translation means supporting said gear blank support means for movement in a first direction toward and away from said first axis and in a second direction extending in the longitudinal direction of said first axis; a drive motor; means mounted on said tool support means for actuating said drive motor whenever said cutting tool reaches either of its end positions to cause said drive motor upon each actuation to turn through a predetermined number of revolutions; and transmission means between said motor, said gear blank support means and said translation means, said transmission means being constructed and arranged to turn said gear blank support means about said second axis through an angle and to move said translation means in said first and said second direction upon each actuation of said motor in such a manner that the angle through which said gear blank is turned and the distance in which it is carried by said translation means in said first and said second direction will vary in dependence on the angular position of said gear blank support means at the moment of actuation of said drive motor.

2. A combination as defined in claim 1, wherein said transmission means comprises a first gear having axially extending teeth varying in length from one to the next tooth so that axially successive peripheral portions of said first gear have different numbers of teeth, means transmitting a drive from said motor to said first gear for rotating the latter through 360° upon each actuation of said motor, a second gear meshing with said first gear to be driven thereby and movable in the axial direction of the first gear, means for shifting said second gear in axial direction of said first gear through a predetermined distance upon rotation of said first gear through 360°, and means for connecting said second gear to said gear blank support means and to said translation means for turning said gear blank support means about its axis and for moving said gear blank support means in said first and said second direction during rotation of said second gear.

3. A combination as defined in claim 2, wherein said first gear has opposite ends and wherein the axially extending teeth of at least a plurality of adjacent gear teeth are provided with a gap arranged symmetrically with respect to said opposite ends, the length of said gap in adjacent teeth increases in circumferential direction of the gear from one to the next tooth in such a manner so that the number of teeth of said first gear with which said second gear meshes during rotation of said first gear through 360° will vary during shifting of said second gear in axial direction of said first gear from a maximum to a minimum and again to a maximum number of teeth.

4. A combination as defined in claim 2, wherein said translation means comprises a pair of superimposed worktables respectively movable in said first and said second direction relative to each other.

5. A combination as defined in claim 4, wherein said gear blank support means comprises a shaft mounted for rotation about its axis on said worktable which is movable in said first direction and including as additional worktable mounted on a base for movement in said first direction and mounting the other of said pair of worktables movable in said second direction, and manually operable means cooperating with said additional worktable for moving the latter in said first direction.

6. A combination as defined in claim 5, wherein said transmission means include further a worm wheel and a cam each having a peripheral contour corresponding to that of the gear blank to be cut and being coaxially mounted on said shaft for rotation therewith, follower means on said other worktable engaging said cam, a worm connected to said second gear to be driven thereby, and means on said other worktable cooperating with said follower means for maintaining the latter in engagement with said cam and said worm in mesh with said worm wheel.

7. A combination as defined in claim 5, and including a second drive motor mounted on said additional work table, means connecting said second drive motor to said transmission means for moving said other worktable upon actuation of said second drive motor in said second direction and opposite to said direction it is moved through said transmission means by said first-mentioned drive motor, and additional actuation means comprising a pair of switch means mounted on said other turntable spaced in said second direction from each other and means fixed to said second gear for movement therewith in said second direction for actuating said switch means.

* * * * *